(12) United States Patent
Vo et al.

(10) Patent No.: US 10,329,479 B2
(45) Date of Patent: Jun. 25, 2019

(54) SURFACE-MODIFIED NANOPARTICLES

(71) Applicant: Nanoco Technologies Ltd., Manchester (GB)

(72) Inventors: Cong-Duan Vo, Manchester (GB); Hao Pang, Sale (GB); Imad Naasani, Manchester (GB)

(73) Assignee: Nanoco Technologies Ltd., Manchester (GB)

( * ) Notice: Subject to any disclaimer, the term of this patent is extended or adjusted under 35 U.S.C. 154(b) by 9 days.

(21) Appl. No.: 15/805,880

(22) Filed: Nov. 7, 2017

(65) Prior Publication Data
US 2018/0057735 A1 Mar. 1, 2018

Related U.S. Application Data

(63) Continuation of application No. 14/579,339, filed on Dec. 22, 2014, now abandoned.

(60) Provisional application No. 61/924,060, filed on Jan. 6, 2014.

(51) Int. Cl.
*C09K 11/02* (2006.01)
*C09K 11/08* (2006.01)

(52) U.S. Cl.
CPC ............ *C09K 11/025* (2013.01); *C09K 11/08* (2013.01)

(58) Field of Classification Search
CPC .............................. A61K 47/02; C08F 287/00

USPC .......................... 252/408.1; 424/497; 525/94
See application file for complete search history.

(56) References Cited

U.S. PATENT DOCUMENTS

| | | |
|---|---|---|
| 8,021,689 B2 | 9/2011 | Reddy et al. |
| 2003/0133963 A1 | 7/2003 | Hubbell et al. |
| 2005/0136258 A1 | 6/2005 | Nie et al. |
| 2008/0031899 A1 | 2/2008 | Reddy et al. |
| 2010/0193767 A1 | 8/2010 | Naasani et al. |
| 2011/0045094 A1 | 2/2011 | Han et al. |
| 2013/0190493 A1 | 7/2013 | Naasani |
| 2013/0243874 A1 | 9/2013 | Sun et al. |

FOREIGN PATENT DOCUMENTS

TW 201317325 A 5/2013

OTHER PUBLICATIONS

Taiwan Search Report filed in copending Taiwanese Divisional Application No. 106107441, dated Jan. 12, 2018, 1 page (translated).

*Primary Examiner* — Khanh T Nguyen
(74) *Attorney, Agent, or Firm* — Blank Rome LLP

(57) ABSTRACT

The surfaces of nanoparticles (QDs) are modified with amphiphilic macromolecules, for example, amphiphilic copolymers. The surface modification renders the QDs more compatible with oxygen-excluding matrices, such as epoxy resin, polyurethane resin, polyester resins or any hydrophilic inorganic/organic hybrid resin such as (meth)acrylate-functionalized polyhedral oligomeric silsesquioxane (POSS).

21 Claims, 1 Drawing Sheet

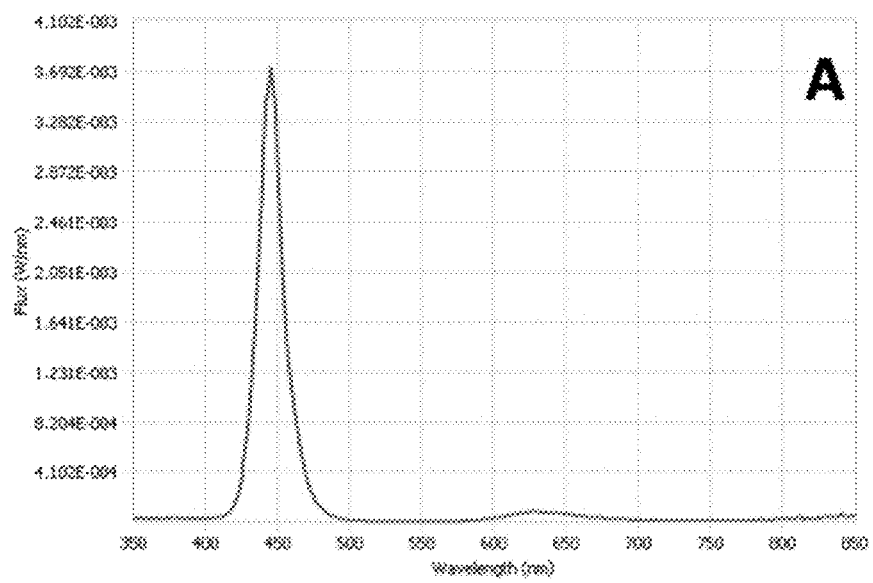
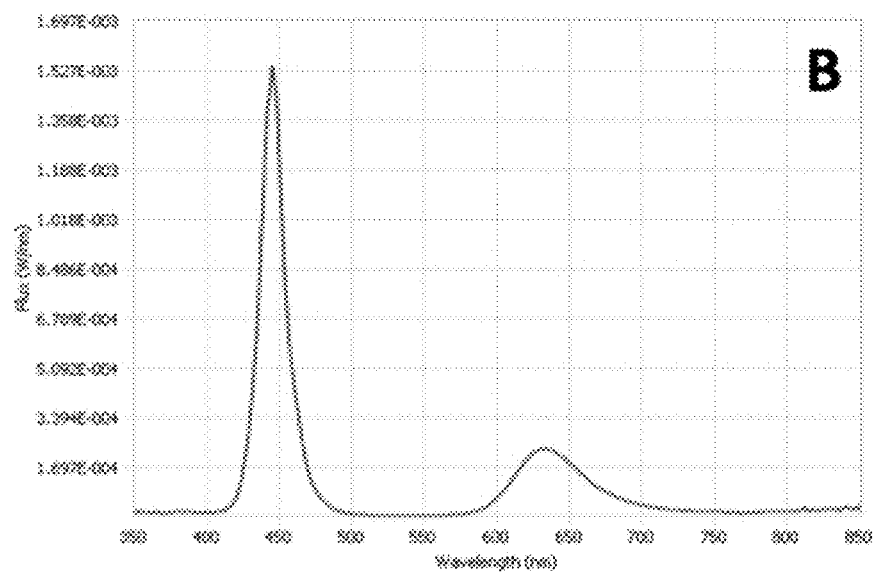

SURFACE-MODIFIED NANOPARTICLES

CROSS-REFERENCE TO RELATED APPLICATIONS

This application is a continuation of U.S. application Ser. No. 14/579,339, filed Dec. 22, 2014, which claims the benefit of U.S. Provisional Application No. 61/924,060 filed on Jan. 6, 2014, the contents of which are incorporated by reference herein in their entirety.

STATEMENT REGARDING FEDERALLY SPONSORED RESEARCH OR DEVELOPMENT

Not Applicable

BACKGROUND OF THE INVENTION

1. Field of the Invention

The present invention generally relates to nanoparticles. More particularly, it relates to methods for modifying the external surface of semiconductor nanoparticles.

2. Description of the Related Art Including Information Disclosed Under 37 CFR 1.97 and 1.98

Nanoparticles

There has been substantial interest in the preparation and characterization of compound semiconductors consisting of particles with dimensions in the order of 2-100 nm, often referred to as quantum dots (QDs) and/or nanoparticles. Studies in this field have focused mainly on the size-tunable electronic, optical and chemical properties of nanoparticles. Semiconductor nanoparticles are gaining interest due to their potential in commercial applications as diverse as biological labeling, solar cells, catalysis, biological imaging, and light-emitting diodes.

Two fundamental factors (both related to the size of the individual semiconductor nanoparticles) are primarily responsible for their unique properties. The first is the large surface-to-volume ratio: as a particle becomes smaller, the ratio of the number of surface atoms to those in the interior increases. This leads to the surface properties playing an important role in the overall properties of the material. The second factor is that, for many materials (including semiconductor nanoparticles), the electronic properties of the material change with particle size. Moreover, because of quantum confinement effects, the band gap typically becomes gradually larger as the size of the nanoparticle decreases. This effect is a consequence of the confinement of an "electron in a box," giving rise to discrete energy levels similar to those observed in atoms and molecules, rather than a continuous band as observed in the corresponding bulk semiconductor material. Semiconductor nanoparticles tend to exhibit a narrow bandwidth emission that is dependent upon the particle size and composition of the nanoparticle material. The first excitonic transition (band gap) increases in energy with decreasing particle diameter.

Semiconductor nanoparticles of a single semiconductor material, referred to herein as "core nanoparticles," along with an outer organic passivating layer, tend to have relatively low quantum efficiencies due to electron-hole recombination occurring at defects and dangling bonds situated on the nanoparticle surface that can lead to non-radiative electron-hole recombinations.

One method to eliminate defects and dangling bonds on the inorganic surface of the nanoparticle is to grow a second inorganic material (typically having a wider band-gap and small lattice mismatch to that of the core material) on the surface of the core particle to produce a "core-shell" particle. Core-shell particles separate carriers confined in the core from surface states that would otherwise act as non-radiative, recombination centers. One example is ZnS grown on the surface of CdSe cores. Another approach is to prepare a core-multi shell structure where the "electron-hole" pair is completely confined to a single shell layer consisting of a few monolayers of a specific material such as a quantum dot-quantum well structure. Here, the core is typically a wide bandgap material, followed by a thin shell of narrower bandgap material, and capped with a further wide-bandgap layer. An example is CdS/HgS/CdS grown using substitution of Hg for Cd on the surface of the core nanocrystal to deposit just a few monolayers of HgS that is then overgrown by monolayers of CdS. The resulting structures exhibit clear confinement of photo-excited carriers in the HgS layer.

The most-studied and prepared semiconductor nanoparticles to date have been so-called "II-VI materials," for example, ZnS, ZnSe, CdS, CdSe, and CdTe, as well as core-shell and core-multi shell structures incorporating these materials. However, cadmium and other restricted heavy metals used in conventional QDs are highly toxic elements and are of major concern in commercial applications. The inherent toxicity of cadmium-containing QDs prevents their use in applications involving animals or humans. For example, recent studies suggest that QDs made of a cadmium chalcogenide semiconductor material can be cytotoxic in a biological environment unless protected. Specifically, oxidation or chemical attack through a variety of pathways can lead to the formation of cadmium ions on the QD surface that can be released into the surrounding environment. Although surface coatings such as ZnS can significantly reduce the toxicity, it may not completely eliminate it because QDs can be retained in cells or accumulated in the body for a long period of time, during which their coatings may undergo some form of degradation that exposes the cadmium-rich core.

The toxicity affects not only the progress of biological applications but also other applications including optoelectronic and communication because heavy metal-based materials are widespread in many commercial products including household appliances such as IT and telecommunication equipment, lighting equipment, electrical and electronic tools, toys, leisure and sports equipment. Legislation to restrict or ban certain heavy metals in commercial products has been already passed in many jurisdictions throughout the world. For example, European Union Directive 2002/95/EC, known as the "Restrictions on the use of Hazardous Substances in electronic equipment" (or RoHS), bans the sale of new electrical and electronic equipment containing more than certain levels of lead, cadmium, mercury, hexavalent chromium along with polybrominated biphenyl (PBB) and polybrominated diphenyl ether (PBDE) flame retardants. This law requires manufacturers to find alternative materials and develop new engineering processes for the creation of common electronic equipment. In addition, on 1 Jun. 2007, a European Community Regulation came into force concerning chemicals and their safe use (EC 1907/2006). This Regulation deals with the Registration, Evaluation, Authorization and Restriction of Chemical substances and is known as "REACH". The REACH Regulation imposes greater responsibility on industry to manage the risks from chemicals and to provide safety information on the substances. It is anticipated that similar laws and regulations will be extended worldwide including China, Korea, Japan and the U.S. Thus, there is significant economic incentive to develop alternatives to Group II-VI QD materials.

Other semiconductor nanoparticles that have generated considerable interest include nanoparticles incorporating Group III-V and Group IV-VI materials, such as GaN, GaP, GaAs, InP, and InAs. Due to their increased covalent nature, III-V and IV-VI highly crystalline semiconductor nanoparticles are more difficult to prepare and much longer annealing times are usually required. However, there are now reports of III-VI and IV-VI materials being prepared in a similar manner to that used for the II-VI materials. Methods for synthesizing core and core-shell nanoparticles are disclosed, for example, in U.S. Pat. Nos. 6,379,635, 7,803,423, 7,588,828, 7,867,556, and 7,867,557. The contents of each which are hereby incorporated by reference, in their entireties.

Surface Modification

Many applications of nanoparticles require that the semiconductor nanoparticle be compatible with a particular medium. For example, some biological applications such as fluorescence labeling, in vivo imaging and therapeutics require that the nanoparticles be compatible with an aqueous environment. For other applications, it is desirable that the nanoparticles be dispersible in an organic medium such as aromatic compounds, alcohols, esters, or ketones. For example, ink formulations containing semiconductor nanoparticles dispersed in an organic dispersant have been proposed for use in fabricating thin films of semiconductor materials for photovoltaic (PV) devices.

A particularly attractive potential field of application for semiconductor nanoparticles is in the development of next generation light-emitting diodes (LEDs). LEDs are becoming increasingly important in, for example, automobile lighting, traffic signals, general area lighting, and liquid crystal display (LCD) backlighting and display screens. Nanoparticle-based light-emitting devices have been made by embedding semiconductor nanoparticles in an optically clear (or sufficiently transparent) LED encapsulation medium, typically a silicone or an acrylate, which is then placed on top of a solid-state LED. The use of semiconductor nanoparticles potentially has significant advantages over the use of more conventional phosphors. For example, semiconductor nanoparticles provide the ability to alter the emission spectrum of an LED-based illumination device. Semiconductor nanoparticles also have strong absorption properties and low scattering when the nanoparticles are well dispersed in a medium. The nanoparticles may be incorporated into an LED encapsulating material. It is important that the nanoparticles be well dispersed in the encapsulating material to prevent loss of quantum efficiency. Methods developed to date are problematic because the nanoparticles tend to agglomerate when formulated into conventional LED encapsulant materials, thereby reducing the optical performance of the nanoparticles. Moreover, even after the nanoparticles have been incorporated into the LED encapsulant, oxygen can still migrate through the encapsulant to the surfaces of the nanoparticles, which can lead to photo-oxidation and, as a result, a drop in quantum yield (QY).

The compatibility of a nanoparticle with a medium as well as the nanoparticle's susceptibility to agglomeration, photo-oxidation and/or quenching, is mediated largely by the surface composition of the nanoparticle. The coordination about the final inorganic surface atoms in any core, core-shell or core-multi shell nanoparticle is incomplete, with highly reactive "dangling bonds" on the surface, which can lead to particle agglomeration. This problem may be overcome by passivating (capping) the "bare" surface atoms with protective organic groups, referred to herein as capping ligands or a capping agent. The capping or passivating of particles not only prevents particle agglomeration from occurring, the capping ligand also protects the particle from its surrounding chemical environment and provides electronic stabilization (passivation) to the particles, in the case of core material. The capping ligand is usually a Lewis base bound to surface metal atoms of the outermost inorganic layer of the particle. The nature of the capping ligand largely determines the compatibility of the nanoparticle with a particular medium. These capping ligand are usually hydrophobic (for example, alkyl thiols, fatty acids, alkyl phosphines, alkyl phosphine oxides, and the like). Thus, the nanoparticles are typically dispersed in hydrophobic solvents, such as toluene, following synthesis and isolation of the nanoparticles. Such capped nanoparticles are typically not dispersible in more polar media.

For many commercial applications of QDs it is desirable to incorporate the QDs in an encapsulating material, such as an LED encapsulant or a polymer. In such situations it is important that the QDs remain as fully mono-dispersed as possible and without significant loss of quantum efficiency. However, QDs can agglomerate when formulated into encapsulant matrices, reducing the optical performance of the quantum dots. Moreover, once the quantum dots are incorporated into the encapsulant, oxygen can migrate through the encapsulant to the surfaces of the quantum dots, which can lead to photo-oxidation and, as a result, a drop in quantum yield (QY).

One way of addressing the problem of oxygen migration to the QDs has been to incorporate the QDs into a medium having low oxygen permeability to form "beads" of such a material containing QDs dispersed within the bead. The QD-containing beads can then be dispersed within an LED encapsulant. Examples of such bead materials include polymers having low oxygen permeability. Such beads are described in U.S. Pub. No. 2011/0068322 and U.S. Pub. No. 2010/0123155, the entire contents of which are hereby incorporated by reference. However, polymers that are highly impermeable to oxygen often are not the most compatible with the QDs. It has been found that QDs are generally more compatible with hydrophobic resins, such as acrylates, compared to more hydrophilic resins, such as epoxies. Thus, polymer films made of QDs dispersed in acrylates tend to have higher initial quantum yields (QYs) than QD films using hydrophilic resins such as epoxy resins. The higher initial QY may be due to the compatibility of the QD with the hydrophobic polymer. However, films of hydrophobic resins, such as acrylates, tend to be permeable to oxygen, while epoxy resin polymers and similar hydrophilic polymers tend to be better at excluding oxygen. Thus, the QY of QDs in hydrophobic polymers can decrease precipitously over time due to oxidation.

Thus, there is a need in the art for nanoparticles that are compatible with polymers that are effective at excluding oxygen, such as epoxides while maintaining the integrity and photo-physical properties of the nanoparticle. The present invention is directed to overcoming, or at least reducing, the effects of one or more of the problems discussed above.

BRIEF SUMMARY OF THE INVENTION

Disclosed herein are surface-modified nanoparticles. The surfaces of the nanoparticles may be modified with amphiphilic macromolecules, for example, amphiphilic copolymers. The surface modification renders the QDs more compatible with oxygen-excluding matrices, such as epoxy resins, polyurethane resins, polyester resins or any hydrophilic inorganic/organic hybrid resins such as (meth)acrylate-functionalized, polyhedral, oligomeric, silsesquioxane (POSS).

The foregoing summary is not intended to summarize each potential embodiment or every aspect of the present disclosure.

BRIEF DESCRIPTION OF THE SEVERAL VIEWS OF THE DRAWING(S)

FIG. 1 shows emission spectra of unmodified QDs (A) and $PEG_{2000}$-$PPS_{10}$-treated QDs (B).

DETAILED DESCRIPTION OF THE INVENTION

One aspect of the present invention is a nanoparticle that is rendered compatible with oxygen-excluding matrices, such as epoxy resins. It should be noted that the terms quantum dot, QD, nanoparticle, and nanocrystal are used interchangeably herein to mean nanoparticles such as those described in the Background section, above. The instant disclosure is not limited to any particular type of nanoparticle. Nanoparticles of metal oxides (for example, iron oxides, magnetic nanoparticles, titanium oxides, zinc oxide, zirconium oxide, aluminum oxide), gold nanoparticles and silver nanoparticles can be all treated and surface-modified using the methods described herein. In preferred embodiments, the nanoparticle may include a semiconductor material, preferably a luminescent semiconductor material. The semiconductor material may incorporate ions from any one or more of Groups 2 to 16 of the periodic table, and may include binary, ternary and quaternary materials, that is, materials incorporating two, three or four different ions respectively. By way of example, the nanoparticle may incorporate a semiconductor material, such as, but not limited to, CdS, CdSe, CdTe, ZnS, ZnSe, ZnTe, InP, InAs, InSb, AlP, AlS, AlAs, AlSb, GaN, GaP, GaAs, GaSb, PbS, PbSe, Si, Ge and combinations thereof. According to various embodiments, nanoparticles may have diameters of less than around 100 nm, less than around 50 nm, less than around 20 nm, less than around 15 nm and/or may be in the range of around 2 to 10 nm in diameter.

Nanoparticles that include a single semiconductor material, e.g., CdS, CdSe, ZnS, ZnSe, InP, GaN, etc. may have relatively low quantum efficiencies because of non-radiative electron-hole recombination that occurs at defects and dangling bonds at the surface of the nanoparticles. In order to address these issues in some measure, the nanoparticle cores may be at least partially coated with one or more layers (also referred to herein as "shells") of a material different than that of the core, for example a different semiconductor material than that of the "core." The material included in the (or each) shell may incorporate ions from any one or more of Groups 2 to 16 of the periodic table. When a nanoparticle has two or more shells, each shell may be formed of a different material. In an exemplary core/shell material, the core is formed from one of the materials specified above and the shell includes a semiconductor material of larger band-gap energy and similar lattice dimensions as the core material. Exemplary shell materials include, but are not limited to, ZnS, ZnO, MgS, MgSe, MgTe and GaN. An exemplary multi-shell nanoparticle is InP/ZnS/ZnO. The confinement of charge carriers within the core and away from surface states provides nanoparticles of greater stability and higher quantum yield.

While the disclosed methods are not limited to any particular nanoparticle material, an advantage of the disclosed methods is that these methods can be used to modify the surface of cadmium-free nanoparticles, that is, nanoparticles comprising materials that do not contain cadmium. It has been found that it is particularly difficult to modify the surface of cadmium-free nanoparticles. Cadmium-free nanoparticles readily degrade when prior art methods, such as prior art ligand exchange methods, are used to modify the surface of such cadmium-free nanoparticles. For example, attempts to modify the surface of cadmium-free nanoparticles have been observed to cause a significant decrease in the luminescence quantum yield (QY) of such nanoparticles. Examples of cadmium free nanoparticles include nanoparticles comprising semiconductor materials, e.g., ZnS, ZnSe, ZnTe, InP, InAs, InSb, AlP, AlS, AlAs, AlSb, GaN, GaP, GaAs, GaSb, PbS, PbSe, Si, Ge, and particularly, nanoparticles comprising cores of one of these materials and one or more shells of another of these materials.

Typically, as a result of the core and/or shelling procedures employed to produce the core, core/shell or core/multishell nanoparticles, the nanoparticles are at least partially coated with a surface binding ligand such as myristic acid, hexadecylamine and/or trioctylphosphineoxide. Such ligands are typically derived from the solvent in which the core and/or shelling procedures were carried out. While ligands of this type can increase the stability of the nanoparticles in non-polar media, provide electronic stabilization, and/or negate undesirable nanoparticle agglomeration, as mentioned previously, such ligands typically prevent the nanoparticles from stably dispersing or dissolving in more polar media, such as epoxy resins.

The instant disclosure describes methods for rendering QDs more compatible with epoxy resins by modifying the surface of a QD by adsorbing amphiphilic macromolecules (i.e., macromolecules having a polar portion and a non-polar portion) on the surface. Particularly suitable amphiphilic macromolecules are block co-polymers having a first block with an affinity for the QD surface and a second block that is more polar than the first block and/or has affinity for epoxide resin. According to one embodiment, the first block is non-polar. The first block may incorporate one or more atoms having affinity for the QD surface. According to one embodiment, the first block incorporates at least three atoms having affinity for the QD surface. According to one embodiment, the first block incorporates two or more monomers, each monomer including at least one atom having affinity for the QD surface.

According to one embodiment, the second block comprises a polyalkylene oxide. According to one embodiment, the second block includes polyethylene oxide (PEG).

One example of a suitable block copolymer is a polyalkylene glycol-poly(alkylene sulfide) block copolymer such as polyethylene glycol-b-poly(propylene sulfide) (PEG-PPS):

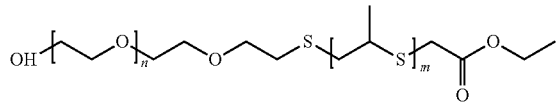

where n and m are integers. The values of n and m may be selected to optimize the interaction of the copolymer with the QD surface and with the matrix. According to certain embodiments, n and m are independently from about 5 to about 500, about 5 to 100, or about 5 to about 50. According to one specific example, n is 45 and m is 10. According to one embodiment, PEG-PPS copolymers with a short PPS block (m=10) provide an optimum balance between compatibility with an epoxy matrix and steric hindrance with molecules on the QD surface. PEG-PPS block copolymers can be synthesized using a procedure described in Wang et al., *Polymer*, 2009, 50, 2863, the entire contents of which are hereby incorporated by reference. Briefly, thiolate-terminated propylene sulfide oligomer is reacted with PEG chain bearing a thiol reactive 2-bromoacetate terminal group.

Another example of a macromolecule suitable for modifying the surface of a QD, as described herein, is a macromolecule having a first block that is a reversible addition fragmentation chain transfer agent (RAFT-CTA) and a second block that is a polyalkylene glycol. A specific example of such a macromolecule is polyethylene glycol macro RAFT CTA (PEG-CTA):

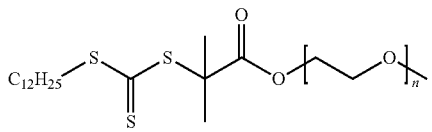

As with the PEG-PPS copolymer described above, the value of n for the PEG-CTA macromolecule can be selected to provide an optimum balance between compatibility with an epoxy matrix and steric hindrance with molecules on the QD surface. Particular examples include n=10, 45, and 113.

PEG-CTA macromolecule, as illustrated above, can be synthesized as described in C. D. Vo et al., *J. Polym. Sci. Part A Polym. Chem.*, 2010, 48, 2032, the entire contents of which are incorporated herein by reference. Briefly, oligoethylene glycol methyl ether is reacted with the RAFT CTA in the presence of a coupling agent such as N, N'-dicyclohexyl carbodiimide (DCCI), as shown here:

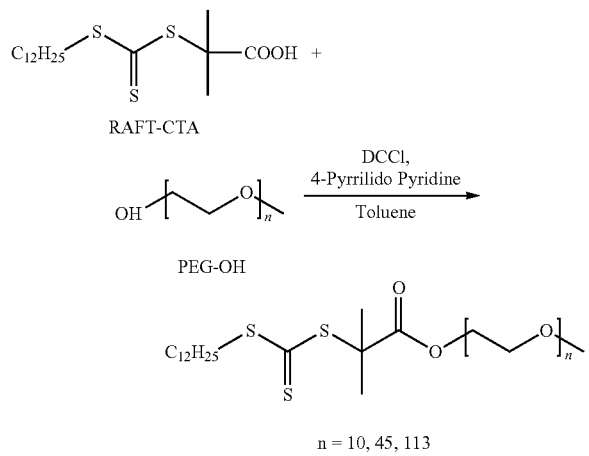

n = 10, 45, 113

The synthesis of the RAFT-CTA is described in Lai, J. T. et al., *Macromolecules*, 2002, 35, 6754, the entire contents of which are incorporated herein by reference.

The QD surface can be modified with the amphiphilic macromolecules by exposing the QD to a solution of the macromolecule. For example, a toluene solution of QD can be added to a toluene solution of the copolymer and the combined solution can be stirred for a time sufficient to allow surface modification to occur. According to some embodiments, the surface modification is performed in an inert atmosphere, such as under nitrogen. For example, a mixture of QDs and an excess of amphiphilic macromolecules can be stirred at about 20° C. for several hours under nitrogen allowing surface modification to occur.

Once the QD surface has been modified with the amphiphilic copolymer, matrix components, such as epoxy resin components, can be added to the mixture of QD and copolymer. Films of the QD-containing resins can then be prepared on substrates. Any method of film preparation can be used. Exemplary methods of preparing films include drop coating, spin coating, and doctor blading. The films can be cured by conventional methods known in the art.

The embodiments disclosed herein can be further understood with reference to the following representative examples. The examples illustrate that amphiphilic macromolecules as surface modifiers for QDs improve the dispersion and quantum yield of the QDs in epoxy resin. The strategy can be extended to other macromolecules and block copolymers, for example, poly(ethylene glycol)-b-poly(glycidyl acrylate)-CTA (PEG-PGA-CTA) whose PEG and PGA are highly compatible with epoxy. The synthesis of PEG-CTA and PEG-PPS is simple under mild conditions. It is possible to synthesize these polymers in large scale from commercially available chemicals (see C D Vo, et al. *J. Polym. Sci. Part A Polym. Chem.*, 2010, 48, 2032 and Wang et al., *Polymer*, 2009, 50, 2863). The surface of QDs can be modified using PEG-CTA via simple mixing of the two components without the need to use multi-step reactions under hash reaction conditions, which can lead to lower quantum yield. The method is therefore easy to scale up. The PEG-CTA contains RAFT chain transfer agent (see C D Vo, et al. *Macromolecules* 2007, 40, 7119 and C D Vo et al. *J. Polym. Sci. Part A Polym. Chem.* 2010, 48, 2032), which can protect the QDs from free radicals while PEG-PPS containing polypropylene sulfide can protect QD from oxidation thanks to its oxidative responsiveness.

EXAMPLES

Example 1: Synthesis of PEG-CTA

PEG-CTA (n=10) was synthesized as follows. Oligomer ethylene glycol methyl ether (Mn=550 g/mol or n=10; 2 gram, 3.63 mmol) was first dissolved in 10 mL toluene and then the toluene was evaporated under reduced pressure. THF (5 mL) was added to dissolve the oligomer under nitrogen before a solution of RAFT CTA (1.32 g, 3.63 mmol) in 5 mL THF and then a mixture of DCCI (0.75 g, 3.63 mmol) and 4-pyrrilido pyridine (53.8 mg, 0.363 mmol) in 5 mL THF were added. The mixture was stirred under nitrogen at 20° C. for 6 days and then refluxed for 4 hours prior to further purification using a silica column.

Example 2: Synthesis of PEG-PPS

PEG-PPS was synthesized as described in Wang et al., *Polymer*, 2009, 50, 2863, referenced above and incorporated herein by reference.

Example 3: Modification of QD Surfaces with PEG-CTA and PEG-PPS

Red QDs (Red CFQD® heavy metal-free quantum dots available from Nanoco Technologies, Ltd. Manchester, U.K.) were modified with $PEG_{2000}$-CTA and with $PEG_{2000}$-$PPS_{10}$. Mixtures of the above amphiphilic macromolecules and quantum dots with a weight ratio of about 1.25/1 in toluene were stirred at 20° C. overnight under nitrogen allowing surface modification to occur.

Epoxy films were prepared incorporating samples of each of the modified QDs and unmodified QDs. Typically, films were prepared by first mixing the toluene-removed modified QDs or unmodified QDs with a mixture of epoxy 135A and epoxy 135B (1:1, w/w), then depositing 80 microliters of the resultant resin into a small glass plate (19 mm×14 mm×0.5 mm) and finally curing on an 80° C. heating plate under $N_2$ overnight. Films incorporating unmodified QDs display macroscopic aggregation of the QDs, while films of the $PEG_{2000}$-CTA-modified and the $PEG_{2000}$-$PPS_{10}$-modified show that the QDs remain well dispersed within the epoxy film.

Optical microscopy images of the red QDs in epoxy films at 50× and 200× magnification using pristine QDs, PEG550-CTA-treated QD, $PEG_{2000}$-CTA-treated QD, and $PEG_{2000}$-$PPS_{10}$-treated QD show, in higher magnification, that QDs modified with amphiphilic macromolecules aggregate less in epoxy resin, compared to unmodified QDs.

FIG. 1 shows the emission spectra of A) unmodified, and B) $PEG_{2000}$-$PPS_{10}$-modified QDs in epoxy films recorded using a Labsphere™ integrating sphere. The ratio of the emission/excitation peak area of the PEG-PPS treated film is higher than that of the unmodified film. EQEs/LED absorbance of 25%/29% and 24/71% were determined for the unmodified and PEG-PPS-modified QD epoxy films respectively. It is clear that LED absorbance of the modified films is higher than that of the unmodified film, indicating better dispersion of the QDs in the modified film as shown in optical microscope images.

Table 1 shows the quantum yield of the unmodified and modified QDs (in epoxy), as measured using a Hamamatsu device.

TABLE 1

| QD | QY Uncured Film | QY Cured Film | Appearance |
|---|---|---|---|
| Unmodified. (InP/ZnS/ZnO; $PL_{toluene}$ = 608 nm, FWHM = 61 nm; QY = 74%) | 35 | 25 | QD aggregation. |
| $PEG_{2000}$-modified using cymel treatment, prepared as described in U.S. Pub. No. 2013/0190493, the entire contents of which are incorporated herein by reference | — | 20 | Transparent. |
| $PEG_{2000}$-modified. | — | 29 | Opaque/homogeneous distribution. |
| Unmodified. (InP/ZnS/ZnO: $PL_{toluene}$ = 611 nm, FWHM = 57 nm; QY = 78%) | 41 | 23 | QD aggregation. |
| $PEG_{550}$-CTA -modified. | 41 | 26 | Opaque/homogeneous distribution. |
| $PEG_{2000}$-CTA -modified. | 42 | 27 | Opaque/homogeneous distribution. |
| $PEG_{2000}$-$PPS_{10}$ -modified. | 44 | 29 | Opaque/homogeneous distribution. |

The data summarized in Table 1 demonstrates the improvement in optical properties of QDs upon modification of the QD surface, as described herein.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter. One skilled in the art will understand that various changes and modifications may be made without departing from the scope of the present invention as literally and equivalently covered by the following claims.

What is claimed is:

1. A display comprising:
    a light-emitting element; and
    a film in optical communication with the light emitting element, the film comprising:
        a matrix material; and
        a population of surface-modified nanoparticles dispersed in the matrix material, each surface-modified nanoparticle comprising:
            a nanoparticle having a core and an external surface; and
            amphiphilic block copolymers on the external surface of the nanoparticle,
    wherein the block copolymers are any one of a polyalkylene glycol-poly(alkylene sulfide) block copolymer and a block copolymer consisting of a first block that is a reversible addition fragmentation chain transfer agent (RAFT-CTA) and a second block that is a polyalkylene glycol.

2. The display recited in claim 1 wherein the amphiphilic block copolymers are adsorbed on the external surface of the nanoparticle.

3. The display recited in claim 1 wherein the nanoparticle comprises a luminescent semiconductor material.

4. The display recited in claim 1 wherein the nanoparticle is selected from the group consisting of CdS, CdSe, CdTe, ZnS, ZnSe, ZnTe, InP, InAs, InSb, AlP, AlS, AlAs, AlSb, GaN, GaP, GaAs, GaSb, PbS, PbSe, Si, Ge and combinations thereof.

5. The display recited in claim 1 wherein the surface-modified nanoparticles do not contain cadmium.

6. The display recited in claim 1 wherein the nanoparticle is a core-shell nanoparticle wherein the core is substantially comprised of a first material and the shell is substantially comprised of a second material different from the first material.

7. The display recited in claim 6 wherein the core-shell nanoparticle comprises a plurality of shells with adjacent shells substantially comprised of different materials.

8. The display recited in claim 6 wherein the core-shell nanoparticle comprises a shell material selected from the group consisting of ZnS, ZnO, MgS, MgSe, MgTe and GaN.

9. The display recited in claim 6 wherein the core-shell nanoparticle comprises a core comprised substantially of InP, first shell comprised substantially of ZnS, and a second shell comprised substantially of ZnO.

10. The display in claim 1 wherein the block copolymer comprises a block that has affinity for an epoxy resin.

11. The display recited in claim 1 wherein the polyalkylene glycol-poly(alkylene sulfide) block copolymer has the general formula

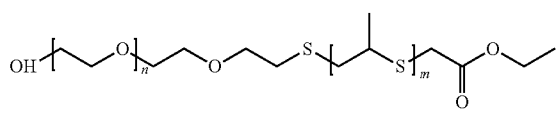

where m and n are positive integers.

12. The display recited in claim 11, wherein m ranges from 5 to 500 and n ranges from 5 to 500.

13. The display recited in claim 11, wherein m ranges from 5 to 50 and n ranges from 5 to 50.

14. The display recited in claim 11, wherein m is 10 and n is 45.

15. The display recited in claim 1, wherein the block copolymer consisting of a first block that is a reversible addition fragmentation chain transfer agent (RAFT-CTA) and a second block that is a polyalkylene glycol has the general formula

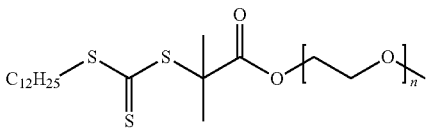

where n is a positive integer.

16. The display recited in claim 15, wherein n ranges from 10 to 113.

17. The display recited in claim 1, wherein the matrix material is an epoxy resin.

18. The display recited in claim 1, wherein the matrix material is a silicone.

19. The display recited in claim 1, wherein the matrix material is an acrylate resin.

20. The display recited in claim 1, wherein the matrix material is a polyurethane resin.

21. The display recited in claim 1, wherein the light-emitting element is a light-emitting diode (LED).

* * * * *